March 25, 1924. 1,487,993
M. WEIL
SPRING MOTOR AND ITS INSTALLATION IN PHONOGRAPHS
Filed Oct. 22, 1920 3 Sheets-Sheet 1
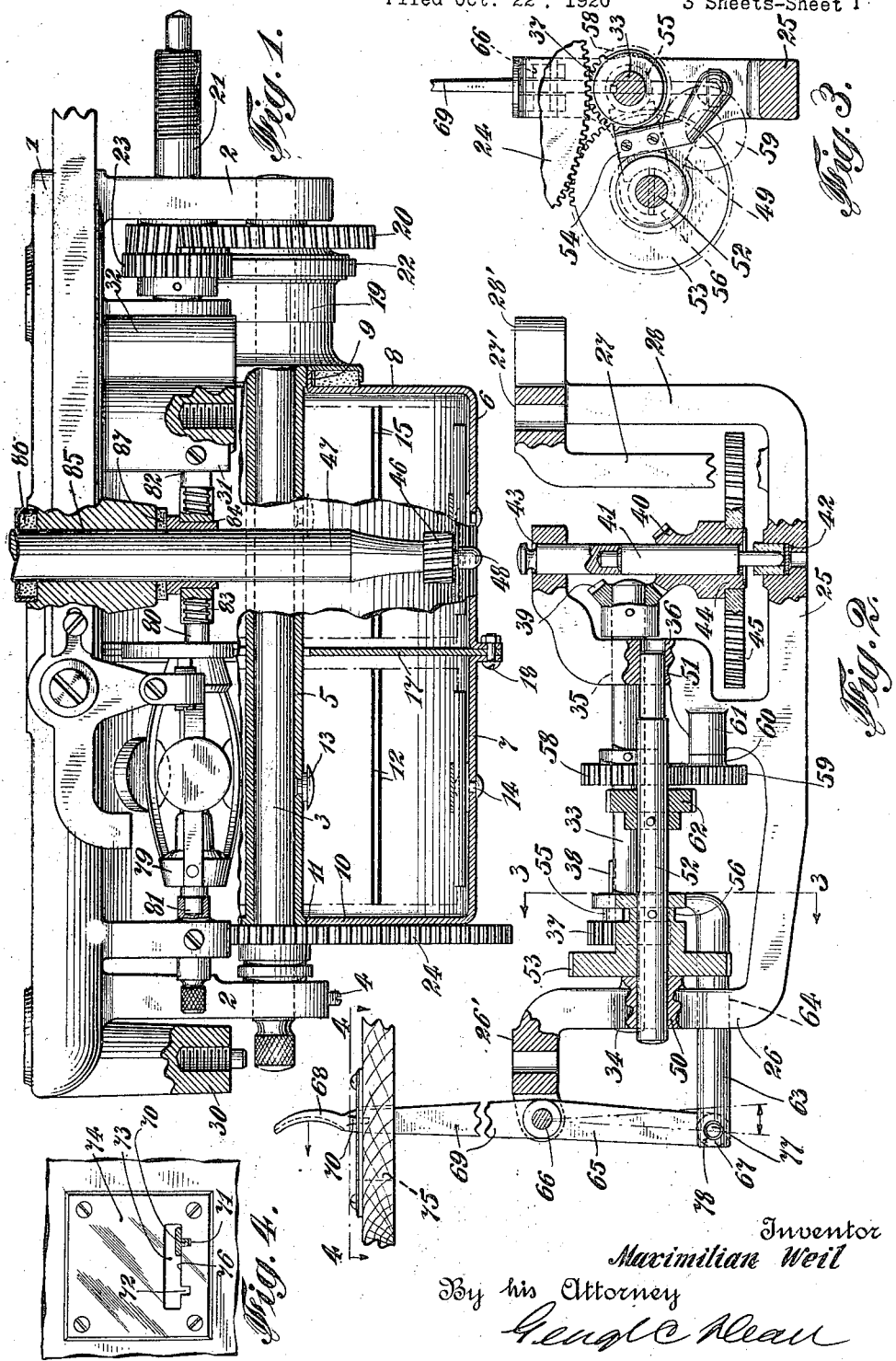
Inventor
Maximilian Weil
By his Attorney March 25, 1924.
M. WEIL
1,487,993
SPRING MOTOR AND ITS INSTALLATION IN PHONOGRAPHS
Filed Oct. 22, 1920    3 Sheets-Sheet 2
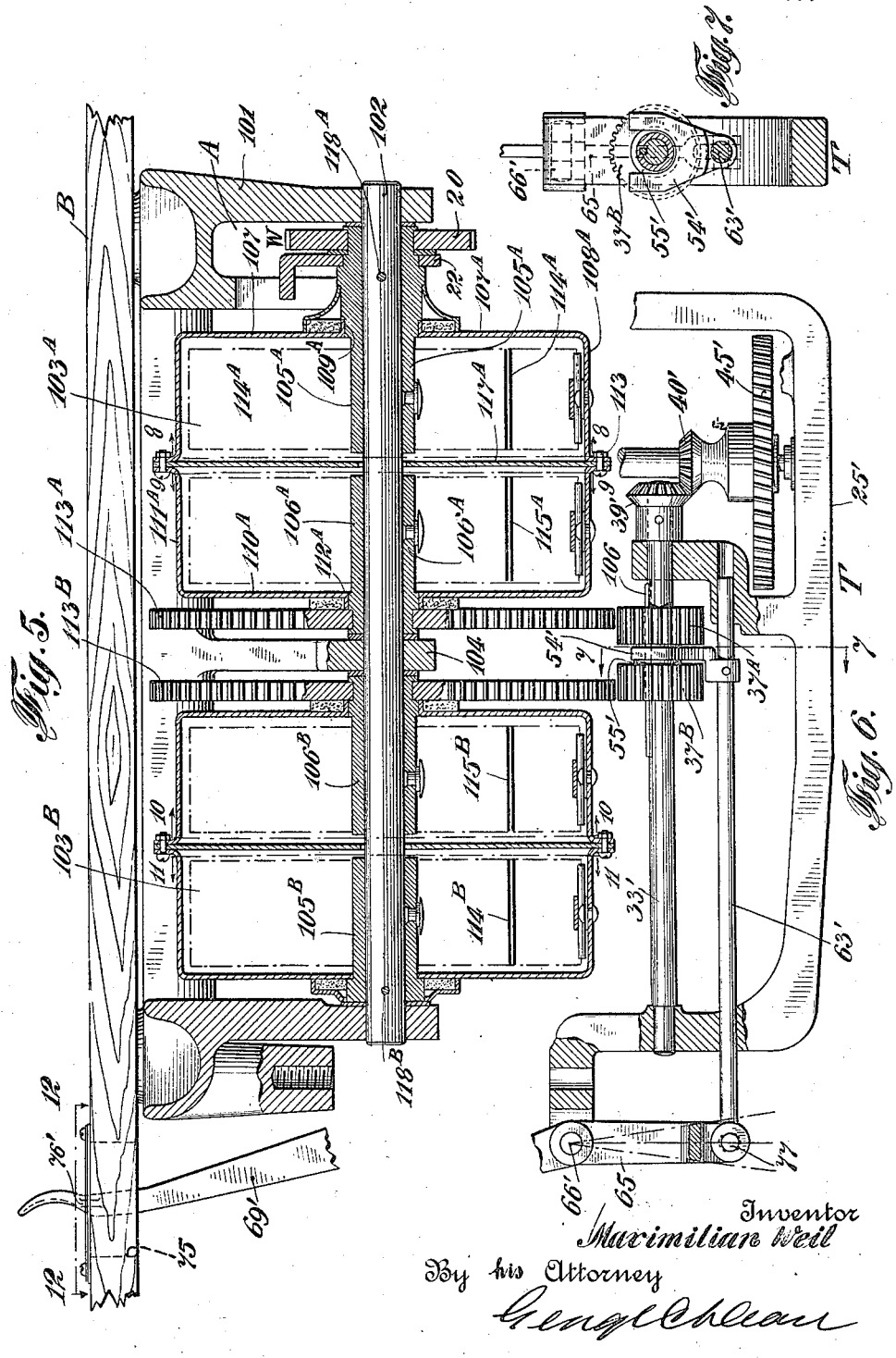
Inventor
Maximilian Weil
By his Attorney

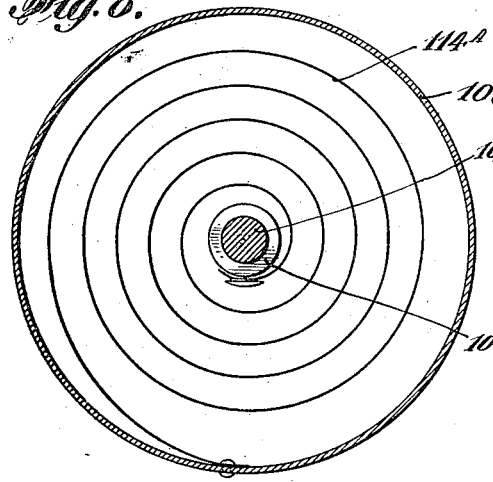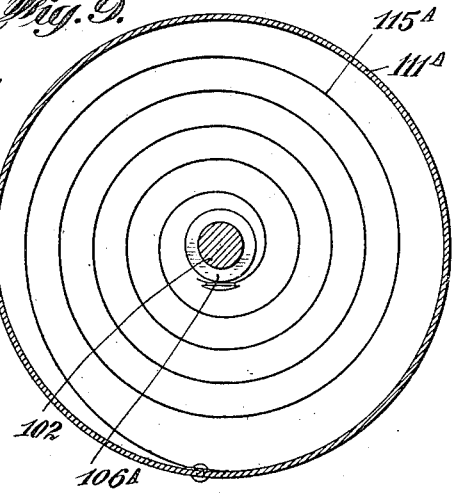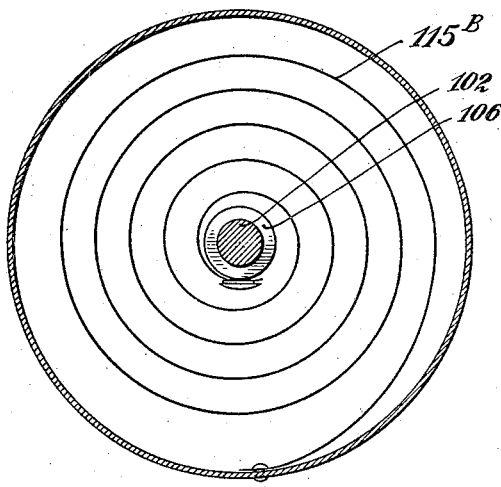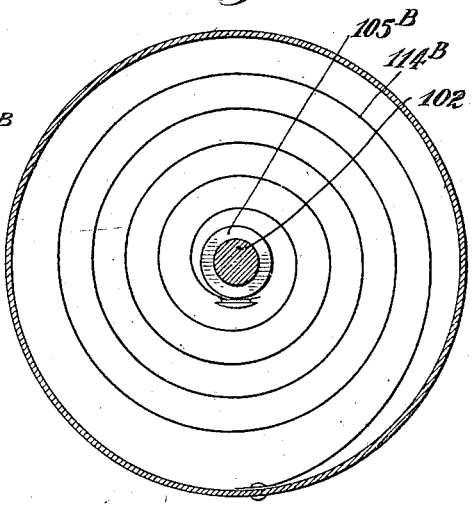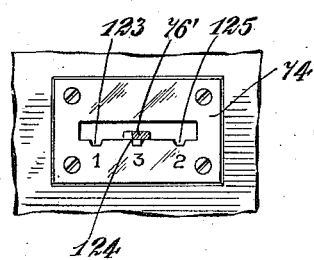

Patented Mar. 25, 1924.

1,487,993

UNITED STATES PATENT OFFICE.

MAXIMILIAN WEIL, OF NEW YORK, N. Y.

SPRING MOTOR AND ITS INSTALLATION IN PHONOGRAPHS.

Application filed October 22, 1920. Serial No. 418,727.

*To all whom it may concern:*

Be it known that I, MAXIMILIAN WEIL, a citizen of the United States, and resident of New York city, in the county of New York and State of New York, have invented certain new and useful Improvements in Spring Motors and Their Installations in Phonographs, of which the following is a specification.

My present invention relates in its more specific application to spring power driving mechanisms for phonographs, and to phonographs embodying such mechanism in novel combinations, although many of the features of the invention are broadly applicable to spring power or equivalent mechanisms regardless in what relation they are employed and regardless what they serve to propel.

My invention is particularly concerned with speed controlled motors of the type embodying a plurality of driving springs whether built into a single or into two or more power drums or other units.

Spring breakages occur without notice in the case of phonograph motors and frequently in the middle of performances. Furthermore, phonographs used in small communities or in camps remote from service stations are frequently disabled by such breakages for prolonged periods pending the arrival of substitute mechanisms or of a specially skilled mechanic capable of making the necessary repairs.

According to one feature of the invention, I provide a compact motor of the above type equipped with means by which the same can be set for satisfactory, efficient, operation even though some of the driving springs are broken or disconnected.

In one preferred embodiment, the driving springs are arranged in equal groups of one or more, and means is provided for readily setting a selected group at will either into or out of operative connection, the inactive group, according to one mode of operation, being kept in reserve in readiness to be placed into service at any time, and especially at such time as there is a breakdown in the group or groups in use.

In another preferred embodiment, the groups of springs are permanently connected to act in multiple and with a minimum of wasted energy upon the mechanism to be driven, means being provided to readily set the apparatus for efficient action when less than all of the springs are in operative condition.

According to another preferred feature, the means for effecting the settings in the various embodiments of the invention is arranged to be readily operable, preferably from a shifting lever carried by the motor and accessible from the exterior of the apparatus. In the preferred embodiment, the lever is resilient and arranged to snap, for each setting into cooperation with a corresponding stop, in order to prevent undesired displacement.

The present invention shares in common with that of my copending application, Serial No. 396,211, filed July 14, 1920, the object of quickly restoring a multi-spring motor to operative condition after a breakdown in the spring mechanism has occurred and this preferably by a simple manipulation, and as will appear from the following detailed description and from certain of the claims, there are broad novel structural features common to the two applications.

In the accompanying drawings in which are shown several possible embodiments of the various features of my invention, Fig. 1 is a transverse sectional view, partly in side elevation, of one embodiment of power plant, Fig. 2 is a view similar to Fig. 1 with parts broken away of corresponding transmission means, Fig. 3 is a sectional view taken along the line 3—3 of Fig. 2, Fig. 4 is a sectional view taken along the line 4—4 of Fig. 2, Fig. 5 is a transverse sectional view of another embodiment of power plant, Fig. 6 is a view similar to Fig. 2 of transmission means coacting with the parts shown in Fig. 5, Fig. 7 is a sectional view taken along the line 7—7 of Fig. 6, Figs. 8, 9, 10 and 11 are sectional views taken along the lines 8—8, 9—9, 10—10 and 11—11 of Fig. 5; and, Fig. 12 is a sectional view taken along the line 12—12 of Fig. 5.

Referring now to the embodiment shown in Figs. 1 to 4, I have shown a motor comprising a base member 1 to be mounted preferably upon the lower surface of a motor board shown at B in Fig. 5. The base member is formed from a casting and has integral therewith standards 2 through which extends a supporting rod 3 for the power plant, this rod being retained against displacement by a set screw 4 through one of the standards. The power plant comprises a single integral sleeve 5 floatingly mounted upon rod 3 with small clearance. Encircling the sleeve is a drum preferably formed of two cups 6 and 7, cup 6 having a base 8 encircling the sleeve 5 as at 9 and floating thereon, and cup 7 having a base 10, similarly related to the opposite end of the sleeve as at 11. A driving spring 12 is coiled about the sleeve 5 and secured thereto preferably by a stud 13, the opposite end of said coil spring being secured as at 14 to the cup 7. A driving spring 15 to one side of spring 12 is similarly related to cup 6. A plate 17 separates the springs 12 and 15 from each other and is preferably clamped in place between the rims of the two cups 6 and 7 by the same bolts 18 which serve to rigidly secure the two cups together in order to form the drum.

The sleeve 5 is preferably extended beyond the end 8 of the drum as at 19 and carries a winding gear mechanism thereon. The details of the latter mechanism are not involved in the present invention and it will, therefore, simply be noted briefly that the winding mechanism may comprise (see Figs. 1 and 5) a gear 20 secured upon the sleeve, the winding torque being transmitted to said gear from a winding handle (not shown) upon a winding shaft 21. A pawl 22 upon the sleeve prevents unwinding by its co-operation with a ratchet wheel 23 upon the winding shaft. The details of the preferred form of winding mechanism are fully disclosed and claimed in my copending application, Serial No. 389,803 filed June 18, 1920.

Secured to the end of the drum opposite the winding mechanism and preferably directly to base 10 of cup 7, I provide a power delivery gear 24 for mesh with a transmission to be fully described below. It will be seen that the springs 12 and 15 are connected in multiple or in parallel between the winding gear mechanism and the power delivery gear, so that if either spring should be ruptured or otherwise eliminated from operative connection, a complete power circuit would remain through the other.

The transmission mechanism preferably comprises an integral casting having a head 25 and legs 26—27—28 projecting from the sides of the head terminating in corresponding feet 26', 27' and 28' to be superposed upon corresponding legs 30, 31 and 32 integral with the casting 1 to one side of the drum and secured in place thereon by screws (not shown) serving to secure the parts together. In general, the relation of the casting 1 to the transmission unit is similar to that in my copending application Serial No. 389,803 above referred to.

A transmission shaft 33 is supported by a pair of bearings 34 and 35, the former in leg 26 and the other in an intermediate leg 36 as shown. Shaft 33 carries a transmission gear 37 slidable upon a key 38 and normally meshing with power delivery gear 24. At the end of shaft 33 to the right of leg 36 there is rigidly mounted a bevel gear 39 meshing with a corresponding bevel gear 40 upon a vertical shaft 41. Shaft 41 rests in a thrust bearing 42 within the head 25 of the transmission casting, the second bearing 43 for this shaft being near the free end of leg 36. The bevel gear 40 has a hub 44 upon which is mounted a spiral gear 45 meshing when the motor is assembled with a corresponding spiral pinion 46 near the lower end of the turn table shaft or driving spindle 47, the free end 48 of said spindle resting upon head 25 in a manner (not shown) but appearing clearly in my copending application above referred to.

Legs 26 and 36 are provided with integral offsets 49 carrying bearings 50 and 51 for a slidable shaft 52 parallel to shaft 33 to one side thereof and at a lower elevation as appears best in Fig. 3. A gear 53 provided with a number of teeth, double that of gear 37 is pinned to shaft 52 and is normally to one side of gear 24 and out of mesh therewith. The center of shaft 52 is spaced from the periphery of gear 24 by a distance equal to the radius of gear 53 so that the latter gear will readily enter into mesh with gear 24 when shifted to the appropriate extent, as will be clear from Fig. 3. A double shifting fork 54 cooperates with a groove 55 in gear 37 and with a similar groove 56 in gear 53, so that as said fork is operated, the gear 37 will be thrown out of mesh with gear 24 and gear 53 into mesh therewith. The distance between the planes of adjacent surfaces of gears 37 and 53 is preferably less than the width of gear 24 so that gear 44 will enter into cooperation with teeth of gear 25 before gear 34 is completely disengaged. By changing gears in the manner just described, it will be seen that the speed multiplying ratio of the transmission is divided by two, for a purpose which will appear clearly in the description of the operation below.

To transmit torque to the bevel gear 39 when the larger gear 53 is in use, I preferably provide the group of gears 57 comprising a gear 58 pinned upon shaft 33, a gear 59 meshing therewith and mounted upon a stud shaft 60 in the transmission frame as at 61, there being a further gear 62 pinned upon the shaft 52 adapted to be brought into mesh with gear 59 at the same time that gear 53 is meshed with gear 24.

The shifting fork 54 is preferably mounted upon a shifting rod 63 extending through a bearing 64 in the transmission frame, the said rod being operated upon by a lever 65 pivoted as at 66 upon the transmission frame, and pinned at one end as at 67 to the shifting rod 63. The free arm of the lever is provided with a finger grip portion 68 preferably directly above the motor board B upon which the motor is supported. By preference the entire lever or, if desired, the portion 69 thereof above the pivot 66 is formed of spring metal and has a struck out lug 70 adapted to enter either notch 71 or notch 72 in a slot 73 provided in a metallic cover plate 74 which closes a corresponding slot 75 in the motor board. The edge 76 of the slot is preferably so related with respect to the resilient spring metal lever that the same is pressed with considerable force thereagainst so that when the lever is brought into registry with notch 71 or 72, the struck out lug 70 therein will enter into mesh with such notch. The notches are so disposed that when the lever cooperates with notch 71, gear 37 will be in mesh with gear 24 and when it cooperates with notch 72, gear 53 will be in mesh and gear 37 out of mesh.

By preference a pin 77 is employed for securing the lever to the shifting rod 63, the corresponding opening 78 in said rod being, however, preferably larger than said pin in order to permit lost motion for the vertical component of the motion of the lever end to which the rod 63 is secured, so that there shall be no lateral pressure upon said rod in shifting operation.

The motor is provided with the usual centrifugal governor 79 for limiting the rotation to the predetermined speed corresponding to the setting of said governor. The construction of the governor need not be set forth in detail, it being simply noted that the same includes a shaft 80 mounted in bearings 81 and 82 and carrying a worm 83 driven through a fiber worm wheel 84, the latter mounted upon the turn table shaft or spindle 47.

In operation, when both springs are in operative condition and properly anchored, the device will be set in the position shown in the drawings. Energy is delivered to the springs through the winding mechanism which directly rotates sleeve 5 and, therefore, winds up the two springs 12 and 15 from their inner ends, gear 24 and with it the drum being held stationary. In the use of the motor for playing a record, the sleeve 5 is held against reverse rotation by the pawl and ratchet of the winding mechanism and the springs 12 and 15 operate to rotate the drum 6—7 and with it the gear 24. The power from the gear 24 is transmitted through gear 37, shaft 33, bevel gear 39, bevel gear 40, spiral gear 45 and through spiral pinion 46 to the driving spindle or turn table shaft 47, the governor 79 limiting the rotation of the turn table shaft to the predetermined substantially uniform speed for which it is set.

Throughout this action, the shifting lever 65 is firmly maintained with lug 70 in notch 71 and thereby securely retains the gear 37 against coming out of engagement with gear 24 and gear 53 against coming into contact therewith. The parts are proportioned for efficient operation, that is, so that the energy wasted as friction in the governor shall be but a small fraction of that delivered as useful power.

When either of the springs breaks, since gears 37 and 24 are in mesh, the other spring will not release the energy stored therein. With this connection, however the power of the single operative spring will be insufficient to continue driving the motor at the required speed. The operator thereupon, grips operating handle 68, pushes it out of the notch 71 and then draws it toward the left until the lug is aligned with the notch 72 and then lets go. By reason of its resilience, the lever will thereupon cause lug 70 to snap into notch 72. By this simple shifting of the lever 65, the shifting rod 63 is moved toward the right displacing the shifting fork 54 to move gear 37 out of engagement with gear 24 and before such disengagement has been completed, to cause gear 53 to enter into mesh with gear 24. As a consequence the energy stored in the intact spring is not released by the shifting action. The gear 53 being pinned to shaft 52, the entire shaft is moved therewith toward the right and gear 62 thereon is brought into mesh with both gears 58 and 59. The power is, thereupon, transmitted from gear 24 in succession through gear 53, shaft 52, gear 62, gear 59 and gear 58 and thence through shaft 33 to the bevel gears 39, 40 and the spiral gears 45 and 46, to drive the spindle or turn table shaft 47. By reason of the substitution of the larger gear 53 in the transmission, the latter will operate at a speed multiplying ratio one half as great as that when gear 37 was employed. The single operative spring will, therefore, drive the turn table shaft at the speed for which the governor was set, the running period of the fully wound motor in this case being, however, no more than one-half that resulting from the use of the gear 37 with both springs in operative condition.

It is seen that in the latter operation the number of successive gears in the power train is greater by two than before the shift, so that the spindle will be driven in the same direction whether gear 37 or gear 53 meshes with gear 24. It is understood that gear 58 and gear 59 are of equal size and thus act as idlers. As a consequence, the change in the speed ratio results entirely from the substitution of gear 53 for gear 37 and since the former gear has twice as many teeth as the latter, the speed ratio is cut in half as above noted.

By the construction described, I thus secure efficient operation both when the power drum is completely operative or when either of the springs is broken. With both springs operative, the running time is approximately double that obtainable upon one spring with the lowered transmission ratio. Where the same transmission is employed both prior and subsequent to the rupture of a spring, it is apparent that this transmission must have a ratio so low that with one of the springs broken, the speed will be reached for which the governor is set. With such ratio, when both springs are in operative condition, the governor preventing any increase in speed, the excess power would be wasted as friction in said governor and the running time would be no longer, prior than subsequent to spring rupture.

It will be apparent that the invention although preferably embodied in a two spring motor as shown, can be carried out with three or more springs arranged in multiple or in parallel and that the principle of the transmission mechanism disclosed can be embodied to provide in general with such larger number of springs, a running time of the motor substantially directly proportional to the number of the springs in operative condition.

The turn table shaft 47 preferably extends within a bearing 85 lubricated from an oil soaked felt washer 86 at the upper end of the bearing functioning as a reservoir of lubricant. The lower surface of the bearing 85 is adjacent the fiber worm wheel 84 and a felt annulus 87 surrounds the spindle 47 and is interposed between the bearing and the fiber gear. In operation, the lubricant will work its way downwardly from the reservoir 86 along the bearing to lubricate the same and the excess will be absorbed by the felt annulus 87, part of the lubricant being delivered therefrom to the fiber gear 84 to prevent the same from becoming excessively dry and brittle.

Part of the oil in the annulus 87 is thrown outwardly by centrifugal force to lubricate the adjacent parts of the motor and more particularly the adjacent governor bearing 82.

Referring to the form of the invention shown in Figs. 5 to 12 inclusive, I have shown in transverse section, a frame 101 generally similar to that shown in Fig. 1. A supporting rod 102 for carrying the power means is mounted upon the frame substantially as in Fig. 1. In the present embodiment, I provide two separate and distinct power plants $103^A$ and $103^B$ of equal external diameter, mounted side by side upon the said rod and separated by a vertical bearing 104. Referring more particularly to power plant $103^A$ the same comprises substantially a two-spring power unit of a type in common use and which taken by itself is not my invention. Briefly, this unit includes a pair of bushings $105^A$ and $106^A$ encircling the rod 102 and a drum formed of two cups, the base $107^A$ of cup $108^A$ floating upon bushing $105^A$ as at $109^A$ and the base $110^A$ of cup $111^A$ floating in similar manner upon bushing $106^A$ as at $112^A$. A power delivery gear $113^A$ is keyed upon the end of bushing $106^A$. Within the drum are disposed a pair of coil springs $114^A$ and $115^A$. Spring $114^A$ is secured to bushing $105^A$ at one end and coiled thereabout within the drum and secured to the latter at its outer end. Spring $115^A$ is similarly coiled about bushing $106^A$ and within the drum and similarly secured at one end to the said bushing and at the other to the drum. The cups $108^A$ and $111^A$ are preferably assembled to form the drum and to retain a separating plate $117^A$ in the same manner as in Fig. 1. It will be seen that in this embodiment of the construction, the springs $114^A$ and $115^A$ are connected in series, the former from bushing $105^A$ to the drum and the latter from the drum to the bushing $106^A$ whence the power is delivered to the delivery gear $113^A$.

The power plant $103^B$ is composed of elements identical with those thus far described in connection with power plant $103^A$, corresponding parts being designated by the same numerals with exponent B. The two units are, however, preferably arranged so that the delivery gears $113^A$ and $113^B$ face each other.

By preference bushing $105^A$ is pinned to the supporting rod 102 as at $118^A$ and the corresponding bushing $105^B$ of unit $103^B$ is similarly pinned to the supporting rod as at $118^B$.

The bushing $105^A$ is provided with an extension upon which is mounted a winding mechanism W preferably identical in construction with that described above and shown in side view in Fig. 1. It will be apparent that as the winding mechanism is operated, the bushing $105^A$ will transmit rotation through spring $114^A$ to the drum and from the drum through spring $115^A$ to the bushing $106^A$, the latter being held against rotation by gear $113^A$. As this rotation is kept up, the two springs $114^A$ and $115^A$ will be wound up to store energy. Concurrently with this operation, the winding energy will be similarly delivered from the rod 102 to bushing $105^B$ and will similarly wind up springs $114^B$ and $115^B$ in the power unit $103^B$. The two power plants it will be seen are operatively connected in multiple or in parallel between the winding mechanism and the transmission.

The transmission frame T is arranged in a manner generally similar to that shown in Fig. 2, similar parts being designated by the same reference numerals as in Fig. 2 except that such numerals are primed. The transmission shaft 33′ has slidably keyed thereon a pair of gears, gear $37^A$ normally meshing with power transmission gear $113^A$ and gear $37^B$ with power transmission $113^B$. These gears are preferably integrally connected and a fork 54′ straddling a groove 55′ between said gears is operated by a shifting rod 63′ generally similar to rod 63 in Fig. 2, the rod being in turn operated by a manual shifting mechanism preferably substantially identical with that shown in Fig. 2 and described above and which need, therefore not again be described. As shown in Fig. 12 the cover plate has three notches 123, 124, 125 corresponding to three positions of the shifting lever to be fully described below. The lug on lever 66′ is in the central notch 124 when both gears $37^A$ and $37^B$ are in mesh as shown in the drawings. It will be understood that the transmission frame is mounted upon the base frame to one side of the power plants and that gears $37^A$ and $37^B$ mesh with the gears $113^A$ and $113^B$ at points above the points of contact indicated on the drawings.

When the motor is operated, with both power plants operatively connected in the manner shown on the drawings it will be understood that both of said plants deliver power in parallel to the shaft 33′ and thence through the bevel gear 39′, bevel gear 40′ and spiral gear 45′ to the turn table shaft or spindle (not shown). When thus operated, the considerable power delivered by the two power plants operating in parallel will rapidly bring the motor up to speed.

In this connection, it will be understood that the gears $113^A$ and $113^B$ must be made to rotate in the same direction, viewed from an end of the apparatus. Since the power plants extend in opposite directions, it follows, in order to produce this result, that the springs must be arranged in such manner that if the two power plants faced the same way the gears $113^A$ and $113^B$ would rotate in opposite directions. As will appear in Figs. 8, 9, 10 and 11 this effect is obtained by coiling the springs $114^A$ and $115^A$ of power plant $103^A$ in a direction opposite to that of the springs $114^B$ and $115^B$ of power plant $103^B$. It will be understood that left handed and right handed springs need not be separately made for this purpose, since a right handed spring turned face down becomes left handed and vice versa.

Each gear $37^A$ and $37^B$ is preferably double the width of the corresponding power delivery gear so that if these gears are shifted to the right through a distance slightly greater than the width of gear $113^B$, gear $37^B$ will be brought completely out of mesh with gear $113^B$ and the left half of gear $37^A$ will remain in mesh with gear $113^A$. The parts are so proportioned and arranged that when lever 63′ is shifted to the left to effect this setting, lug 76′ therein will enter notch 123. When thus connected it is apparent that power plant $103^B$ is completely eliminated from the mechanical circuit and the propulsion will be effected by power plant $103^A$ operating alone. With the gears shifted to the position just described, when the winding mechanism is operated, the torque applied to bushing $105^B$ through the supporting rod 102 will be delivered through the springs $114^B$ and $115^B$ in series to the bushing $106^B$ and to the gear $113^B$ but since the latter is demeshed from gear $37^B$, it is not retained against rotation. The entire power unit will, therefore, be rotated, and the springs of this unit will not be effectively wound, nor can energy be delivered therefrom. I prefer to use the motor shown in Fig. 5 in the manner just described in which one of the power plants, say the left handed one, will be kept idle and in reserve so that when the power plant at the right breaks down, as, for instance, by rupture of either springs $114^A$ or $115^A$, the operating lever 66′ need merely be shifted to the right to throw the reserve power plant into service and to eliminate the inoperative unit from the mechanical circuit. It will be seen that the gears $37^A$ and $37^B$ can also be shifted from central position to the left and notch 125 in the cover plate determines the setting for operation upon the left hand power plant with the one at the right out of service. The motor can be operated, as heretofore noted, with both power plants in service.

In this case when one of the power plants breaks down, the device will continue to operate at the desired speed even if the gears remain in the neutral position shown in the drawings. In this case the power plant in service will rotate the broken unit by torque delivered from the corresponding gear $37^B$ through the other gear $37^A$. However, in this case, it would be preferable to disconnect the gears, in order to prevent the rattling noise which may result if the inoperative or idle power unit is continuously rotated during operation. For this purpose the operating lever 66′ is merely shifted, either to notch 125 at the right or to notch 123 at the left, depending upon which unit has broken down. If the motor stops running when the lever is shifted in one direction, the operative unit has been cut out of service, so that upon shifting to the other notch the correct connection will be established. Thus, it is ascertained which of the units is broken without need for inspection of the interior thereof.

It will be apparent that the principle of the invention disclosed in Figs. 5 to 12 could be embodied in a construction in which each power plant embodies a single spring motor. It will, furthermore, be apparent that the same principle could be carried forward in a construction embodying three or more separate and distinct power plants each having one, two or more springs connected either in series or in multiple, but I prefer to employ the specific construction shown and described.

It will be understood that gearing similar to that employed in the embodiment of Figs. 1 to 4 for changing the speed ratio of the transmission in accordance with the number of springs in use could be applied to the embodiment of Figs. 5 to 12.

The specific shifting mechanism, it will be understood, is applicable generally to any form of motor in order to operate any means for changing mechanical connections. For instance, this device might be used to advantage for operating the clutch employed in the invention of my copending application, Serial No. 396,211, filed July 14, 1920.

I claim:

1. A spring motor comprising in combination, a frame, a power plant mounted thereon comprising a plurality of driving springs, governor means for limiting the operation to a predetermined substantially uniform speed, and means for altering the mechanical transmitting connections in the completely assembled motor for operation at the said predetermined speed with less than all of said springs operatively connected.

2. A spring motor comprising in combination, a frame, a power plant mounted thereon comprising a plurality of coaxial coil driving springs, a single winding means for delivering power to all of said springs, a driving shaft driven from said springs, governor means for limiting the rotation of said driving shaft to a predetermined substantially uniform speed, and means for altering the mechanical transmitting connections for operation at the said predetermined speed with less than all of said springs operatively connected.

3. A spring motor for phonographs and the like comprising in combination, a frame, a power plant mounted thereon and comprising a plurality of coil springs of equal diameter arranged coaxially and side by side, a transmission connected to be driven by said springs, winding means for delivering energy to all of said springs, governing means for limiting the rotation of said transmission to a predetermined substantially uniform speed, and means for effecting a change in the mechanical transmitting connections of said motor to bring about operation at said predetermined speed with less than all of said springs in operative connection.

4. A spring motor for phonographs comprising in combination, a frame, a power plant mounted thereon and comprising a plurality of coil springs of equal diameter arranged coaxially and side by side, winding gear means delivering energy to all of said springs, a transmission including a turn table shaft connected to be driven by all of said springs and governing means for limiting the rotation of said turn table shaft to a predetermined substantially uniform speed, and a shiftable member connected in the mechanical circuit between said winding gear and said turn table shaft to establish a power connection for bringing about operation at said predetermined speed when less than all of said springs are in operative condition.

5. A spring motor for phonographs comprising in combination, a frame, standards integral therewith, a supporting rod retained in horizontal position by said standards, a power plant comprising sleeve means fitting over said rod, a pair of springs of equal diameter coiled about said sleeve means and secured thereto at one end, a drum floatingly mounted upon said sleeve means, the outer ends of said springs being secured thereto, a plate secured within said drum and separating said springs, winding gear means for delivering energy to both of said springs, a transmission connected to be driven by both of said springs and including a turn table shaft, governing means for limiting the rotation of said turn table shaft to a predetermined substantially uniform speed, and a shiftable member connected in the mechanical circuit between said winding gear and said turn table shaft to establish a power connection for bringing about operation at said predetermined speed when any of said springs is out of operative condition.

6. A spring motor for phonographs and the like, comprising in combination, a frame, a power means mounted upon said frame and including a plurality of springs, a turn table shaft, a power transmission operatively connected between said power means and said turn table shaft, governor means for limiting the rotation of said turn table shaft to a predetermined substantially uniform speed, and means for effecting an alteration in said transmission for operation at said predetermined speed with less than all of said springs in use.

7. A spring motor comprising in combination, a support, a power plant mounted thereon and comprising a plurality of coaxially arranged coil springs, winding means for delivering power to be stored in said springs, a driving shaft, a gear transmission between said power means and said driving shaft, and means for establishing a changed gear connection in said transmission for operation with less than all of said springs in use.

8. A spring motor for phonographs and the like, comprising in combination, a frame, a power plant thereon including a pair of similar coaxial drum elements, coil springs therein, power delivery gear means on said power plant, a shiftable gear means having two positions of mesh with respect to said delivery gear means, one for operation when the springs in both said drum elements are in use and the other when the spring means included in one of said drum elements is out of use.

9. In a spring motor, in combination, a power plant comprising a plurality of coaxial drum elements, coil springs within said drum elements, a frame, a single axial supporting rod for maintaining all of said drum elements in position, a transmission, delivery gear means on said power plant for meshing with said transmission, shaft means parallel to said supporting rod, gear means upon said shaft means, and means for shifting said gear means for establishing any of a plurality of power connections with said delivery gear means for operation with different combinations of said springs in use.

10. In a spring motor, in combination, a pair of similar coaxial drum elements, coil spring means within said drum elements, winding gear means for delivering power to the springs in both said drum elements, a transmission, delivery gear means upon said power plant connected to said transmission, the spring means within the two drums being connected in parallel between said winding gears means and said transmission, said transmission including shaft means parallel to the axis of said drum elements, and gear means slidable upon said shaft means having one position of mesh with respect to said delivery gear means for operation when the spring means in both said drum elements are in use and the other when the spring means included in either of said drum elements is out of use.

11. A phonograph motor comprising in combination, a frame, a power plant including a plurality of driving spring elements thereon, winding means for delivering energy to said spring elements, a transmission means for delivering power from said units, governor means for limiting the rotation to a predetermined substantially uniform speed, and manual operating means connected to said frame for altering the mechanical transmitting connections in the completely assembled motor for operation at said predetermined speed with one of said springs out of order.

12. The combination set forth in claim 11 in which the manual operating means is completely carried by the frame.

13. In a phonograph, in combination, a cabinet, a motor secured therein, said motor including a power plant having a plurality of driving spring elements, a transmission connected to be operated by said spring elements all drivingly connected, and manually operated means completely carried by said motor and accessible in the assembled phonograph, for changing the mechanical transmitting connections of said motor for effective operation with less than all of said springs in use.

14. In a phonograph motor, in combination, a pair of complementary frame portions, a multi-spring power plant carried by one of said frame portions, transmission means carried by the other said frame portion, winding means for delivering energy to be stored in all of said springs, a turn table shaft to which the power is delivered by said transmission means, governor means for limiting the rotation to a predetermined substantially uniform speed, means for changing the power connection in the mechanical circuit between said winding means and said turn table shaft for operation at said predetermined speed with less than all of the springs functioning, and a lever arranged to be manually operated for operating said means, said lever having its fulcrum upon one of said frame portions and the end for application of manual force arranged to be accessible when the motor is operatively disposed within a phonograph.

15. In a phonograph motor, in combination, a pair of complementary frame portions, a multi-spring power plant carried by one of said frame portions, transmission means carried by the other of said frame portions, winding means for delivering energy to be stored in all of said springs, a turn table shaft to which the power is delivered by said transmission, a coupling member for changing the power connection in the mechanical circuit between said winding means and said turn table shaft for operation with less than all of the springs functioning and means for operating said coupling member, said means comprising a lever having its fulcrum on one of said frame portions, an operating handle at one end of the lever arranged to be accessible when the motor is mounted in place within a phonograph and a shifting rod supported by one of said frame portions and connecting said coupling member to the opposite end of said lever.

16. In apparatus of the character described, in combination, a multi-spring phonograph motor having a frame, a shifting lever pivoted intermediate its ends upon said frame, said lever having an end accessible from the exterior of the phonograph for manual operation when said motor is mounted in place, a slidable rod connected to the opposite end of said lever, coupling means controlled by said rod to establish any of a plurality of connections within the motor, said lever having a resilient portion and having a restraining means near its operating end projecting from the plane in which said lever moves.

17. In a phonograph, in combination, a casing, a multi-spring motor therein having a frame, a transmission member embodied in said motor adapted to be shifted into any of a plurality of positions of adjustment for operation of the motor with different combinations of said springs in use, a shifting lever for operating said transmission member, said lever having a fulcrum intermediate the ends thereof and upon the frame of said motor, the free or operating end of said lever extending through a wall element of said casing, said lever being resilient and having a lug, and a plate upon said wall element, said plate having notches and being arranged with respect to said resilient lever in such position that when said lever is brought into registry with any said notch, the lug thereon will be urged thereinto by virtue of the resiliency of said lever, thereby retaining said transmission member in one of its positions of adjustment, each said notch corresponding to a position of adjustment.

18. In apparatus of the character described, in combination, a phonograph having a motor board, a notched metallic plate upon said motor board, a phonograph motor secured to the lower surface of said motor board, a resilient lever pivoted to the frame of said motor and having an operating end extending above said notched plate, a lug upon said lever adapted to be projected into a notch in said notched plate by the resiliency of said lever when said lever is brought into registry therewith, a rod slidably disposed in the frame of said motor and connected to the other end of said lever, and means under control of said rod for selectively establishing any of a plurality of possible mechanical connections within the motor.

19. A motor comprising in combination, a plurality of similar springs arranged in equal groups, winding means for delivering energy to be stored therein, a transmission, said groups being connected in multiple between said winding means and said transmission, governing means for limiting the rotation of said transmission to a predetermined substantially uniform speed, and means for setting the speed multiplying ratio of said transmission to a value proportional to the number of the groups of springs operatively connected, whereby the operation will be at said predetermined speed for all settings and the running time will be in direct proportion to the number of operatively connected groups of springs.

20. In a phonograph motor, in combination, winding mechanism, a transmission, a pair of spring power elements connected in parallel between said winding mechanism and said transmission, governing means for limiting the rotation of said transmission under all conditions of operation to a predetermined substantially uniform speed, said transmission including gear shifting means for halving the ratio of speed multiplication when one of said units is disconnected or becomes out of order, whereby the motor will have substantially double the running time when both the power units are operatively connected as compared to that when only one is in use.

21. In a phonograph motor, in combination, winding means, a transmission driven thereby including a turn table shaft, a pair of spring power units connected in parallel between said winding mechanism and said transmission, a delivery gear for said power means, governing means for limiting the rotation of said transmission to a predetermined substantially uniform speed, said transmission including a pair of gears, one having substantially twice the number of teeth of the other arranged so that either can be disposed in mesh with said delivery gear, the other being demeshed, said smaller gear being employed in operation with both spring elements functioning, whereby upon one of said elements becoming out of order and shifting of gears to place the larger gear in mesh with said delivery gear and and to demesh the smaller, said motor will operate upon the operative spring means at said predetermined speed, the running time thereof being approximately one half of the running time upon both springs.

22. In a phonograph motor, in combination, a core member and a drum member coaxial therewith, a plurality of springs arranged side by side, each secured near one end to said core member and coiled thereabout, disposed within said drum member and secured thereto near its outer end, winding means connected to one of said core and drum members, power delivery means connected to the other thereof, transmission means connected to said power delivery units, governor means for limiting the rotation to a predetermined substantially uniform speed, and manually operated means to set the ratio of said transmission so that the running time of the completely wound up motor will be substantially proportional to the number of springs in operative condition.

23. In a phonograph motor, in combination, a core member and a drum member coaxial therewith, a pair of springs coiled about said core member and within said drum member, each said spring being connected at one end to said core member and at the other to said drum member, winding means directly connected to said core member, a power delivery gear directly connected to said drum member, a transmission connected to be driven by said gear, said transmission including a gear meshing with said power delivery gear and a second gear of double the number of teeth of said latter gear normally in idle position, manual means for shifting said gears to substitute said larger gear for said smaller gear in order to change the speed multiplying ratio of said transmission, whereby when both of said springs are in operative condition and said smaller gear is employed in the transmission, the running time will be twice that resulting from the use of the larger gear in the transmission with one of said springs broken or disconnected.

24. In a phonograph motor, in combination, a core member and a drum member coaxial therewith, a pair of springs coiled about said core member and within said drum member, each said spring being connected at one end to said core member and at the other to said drum member, winding means directly connected to said core member, a power delivery gear directly connected to said drum member, a transmission connected to be driven by said gear, said transmission comprising a shaft, a gear slidably mounted thereon and meshing with said power delivery gear, a second shaft and a gear mounted thereon, double the size of the former gear and shiftable to mesh with said power delivery gear but normally out of engagement therewith, manually operated shifting means connected to said transmission gears for substituting the larger for the smaller gear in the transmission circuit to reduce the ratio of speed multiplication upon rupture of one of said springs so that the motor may operate at full speed with only one of said springs in operative condition.

25. In a phonograph motor, in combination, a frame, a core member and a drum member coaxial therewith, a pair of springs coiled about said core member and within said drum member, each said spring being connected at one end to said core member and at the other to said drum member, winding means directly connected to said core member, a power delivery gear directly connected to said drum member, a transmission connected to be driven by said gear, said transmission including a first shaft, a gear slidably mounted thereon and meshing with said power delivery gear, a second shaft slidably arranged parallel to said first shaft, a gear secured thereto of double the number of teeth of said first gear and adapted to mesh with said power delivery gear but normally out of engagement therewith, a second gear upon said first shaft, a second gear upon said second shaft, a third gear rotatable in said frame and in mesh with said second gear upon said first shaft, and means for shifting said first transmission gear to disconnect the same from said power delivery gear and concurrently to shift said second shaft to place said larger gear in mesh with said power delivery gear, and to mesh the second gear upon said second shaft with said third gear, whereby upon rupture of one of the springs of said motor and performance of a shifting operation the larger gear is substituted for the smaller one in the power transmission, thereby reducing the power ratio for operation upon one spring, and the power is transmitted from said second shaft through said third gear to said first shaft, whereby the direction of rotation of the turn table will be the same whether both springs or only one spring is in operative condition.

26. A spring motor comprising in combination, a frame, a spring power plant mounted thereon, governor means for limiting the operation to a predetermined substantially uniform speed, and means for altering the mechanical connection for operation at the said predetermined speed with a section of said power plant out of operative connection.

27. In a phonograph, in combination, a cabinet, a motor therein, said motor having a plurality of driving spring elements, transmission means connected to be operated by said spring elements, and manually operated means accessible in the assembled phonograph for changing the mechanical transmitting connections of said motor for effective operation with less than all of said springs in use.

Signed at New York city, in the county of New York and State of New York, this 20th day of October A. D. 1920.

MAXIMILIAN WEIL.